(12) United States Patent
Wu et al.

(10) Patent No.: US 12,332,553 B2
(45) Date of Patent: Jun. 17, 2025

(54) ADAPTER, CONNECTING MECHANISM, AND PHOTOGRAPHIC DEVICE

(71) Applicant: TILTA INC., Burbank, CA (US)

(72) Inventors: Sen Wu, Shenzhen (CN); Wenping Zeng, Shenzhen (CN); Kefeng Zhou, Shenzhen (CN)

(73) Assignee: TILTA INC., Burbank, CA (US)

( * ) Notice: Subject to any disclaimer, the term of this patent is extended or adjusted under 35 U.S.C. 154(b) by 44 days.

(21) Appl. No.: 18/232,216

(22) Filed: Aug. 9, 2023

(65) Prior Publication Data

US 2024/0402577 A1 Dec. 5, 2024

(30) Foreign Application Priority Data

May 31, 2023 (CN) .......................... 202321381808.X

(51) Int. Cl.
G03B 17/56 (2021.01)
F16M 11/12 (2006.01)
G03B 17/12 (2021.01)

(52) U.S. Cl.
CPC ........... *G03B 17/561* (2013.01); *F16M 11/12* (2013.01); *G03B 17/12* (2013.01); *G03B 17/566* (2013.01); *G03B 2217/002* (2013.01)

(58) Field of Classification Search
CPC .... G03B 17/561; G03B 17/12; G03B 17/566; G03B 2217/002; F16M 11/12
USPC ........................................................ 396/428
See application file for complete search history.

(56) References Cited

U.S. PATENT DOCUMENTS

| | | | |
|---|---|---|---|
| 7,543,784 B2 * | 6/2009 | Lindsay | F16B 7/1418 248/228.2 |
| 7,658,556 B2 * | 2/2010 | Johnson | F16M 11/041 396/428 |
| 8,418,973 B2 * | 4/2013 | Liu | F16M 11/2035 248/176.1 |

(Continued)

FOREIGN PATENT DOCUMENTS

| CN | 207246709 U | | 4/2018 |
|---|---|---|---|
| CN | 212929446 U | * | 4/2021 |

(Continued)

*Primary Examiner* — Stephanie E Bloss
*Assistant Examiner* — Kevin C Butler
(74) *Attorney, Agent, or Firm* — LOZA & LOZA, LLP; Derek Yeung

(57) ABSTRACT

The present disclosure relates to an adapter, a connecting mechanism, and a photographic device in the field of photographic equipment technology. One embodiment of the adapter comprises a fixed part and a rotating part, which are movably connected. The fixed part is equipped with a first locking member on the side facing away from the rotating part for locking in the mounting position, while the rotating part is equipped with a second locking member for locking the photographic device. The present disclosure utilizes the adapter as the fixed part and the rotating part, along with the second locking member, to enable adjustment of the photographic angle by installing the photographic device on the adapter. Furthermore, the first locking member allows the adapter to be installed in different mounting positions, thereby providing further adjustment of the photographic angle. The overall structure is simple and facilitates easy adjustment of the photographic angle.

10 Claims, 15 Drawing Sheets

(56) References Cited

U.S. PATENT DOCUMENTS

| | | | | |
|---|---|---|---|---|
| 8,628,258 | B2 * | 1/2014 | Vogt | F16M 11/18 |
| | | | | 396/428 |
| 9,726,963 | B1 * | 8/2017 | Xiao | F16M 13/02 |
| 10,371,317 | B2 * | 8/2019 | Chen | F16M 13/022 |
| 10,834,916 | B2 * | 11/2020 | D'Acquisto | G03B 17/561 |
| 11,408,553 | B2 * | 8/2022 | Li | G03B 17/561 |
| 2013/0235264 | A1 * | 9/2013 | Johnson, Sr. | G03B 17/566 |
| | | | | 348/375 |
| 2019/0208765 | A1 * | 7/2019 | D'Acquisto | F41H 3/00 |
| 2019/0271902 | A1 * | 9/2019 | Chan | F16M 11/041 |
| 2020/0272031 | A1 * | 8/2020 | Zhu | F16M 11/041 |

FOREIGN PATENT DOCUMENTS

| | | | | |
|---|---|---|---|---|
| CN | 213452491 U | * | 6/2021 | |
| CN | 115307034 A | * | 11/2022 | |
| CN | 116608379 A | * | 8/2023 | |
| CN | 219976073 U | * | 11/2023 | |
| CN | 220037964 U | * | 11/2023 | |
| CN | 114484189 B | * | 12/2023 | F16M 11/041 |
| CN | 220186289 U | * | 12/2023 | |
| CN | 220286841 U | * | 1/2024 | |
| CN | 220688615 U | * | 3/2024 | |
| CN | 118687029 A | * | 9/2024 | F16M 11/04 |
| GB | 2366592 A | * | 3/2002 | F16B 7/0433 |
| RU | 2391688 C2 | * | 6/2010 | F16M 11/02 |
| WO | WO-2007016826 A1 | * | 2/2007 | F16M 11/02 |
| WO | WO-2018232835 A1 | * | 12/2018 | |
| WO | WO-2019000201 A1 | * | 1/2019 | F16M 11/04 |
| WO | WO-2019100306 A1 | * | 5/2019 | F16B 2/18 |
| WO | WO-2024027833 A1 | * | 2/2024 | |

* cited by examiner

ADAPTER, CONNECTING MECHANISM, AND PHOTOGRAPHIC DEVICE

CROSS-REFERENCE TO RELATED APPLICATIONS

The present application for patent claims priority to and the benefit of pending Chinese Patent Application No. 202321381808X, filed May 31, 2023, and hereby expressly incorporated by reference herein as if fully set forth below in its entirety and for all applicable purposes.

TECHNICAL FIELD

The present disclosure relates to the technical field of photographic equipment, in particular to an adapter, a connecting mechanism, and a photographic device.

INTRODUCTION

In various shooting scenarios, cameras are often connected to various photographic devices such as camera gimbals using adapters and mounting brackets. However, existing adapters do not provide convenient means for adjusting the camera's direction when capturing different perspectives. Therefore, there is a need for a simplified adapter that enables easy directional adjustments.

A prior art structure for fixing the camera angle position of a panoramic head in the field of techniques for photography has been disclosed in Chinese application number 201721199300.2. The structure involves a moving component, a camera angle position mechanism, a camera connecting structure, and a clamping fixing mechanism. The clamping fixing mechanism comprises a circular ring, a rotating shaft, a rotating pin, a bracket, and a connecting element. The circular ring consists of a fixed semicircular ring and a rotating semicircular ring. The fixed semicircular ring is affixed to the bracket, while one end of the rotating semicircular ring is fixed to the rotating pin of the fixed semicircular ring. The rotating semicircular ring has the ability to rotate around the rotating pin, while the rotating shaft is secured to the moving component and cooperates with the inner circle of the circular ring. Although this technical solution allows for changes in the camera's direction, it has a complex structure.

BRIEF SUMMARY

The following presents a summary of one or more implementations in order to provide a basic understanding of such implementations. This summary is not an extensive overview of all contemplated implementations and is intended to neither identify key or critical elements of all implementations nor delineate the scope of any or all implementations. Its sole purpose is to present some concepts of one or more implementations in a form as a prelude to the more detailed description that is presented later.

An objective of the present disclosure is to provide a structurally simple adapter that facilitates convenient adjustment of shooting angles using a photographic device (e.g., camera).

Another objective of the present disclosure is to provide a structurally simple connecting mechanism that enables convenient adjustment of shooting angles.

Yet another objective of this disclosure is to provide a structurally simple photographic device that allows for convenient adjustment of shooting angles.

To achieve these objectives, the present disclosure provides an adapter comprising a fixed part and a rotating part that are movably connected together. The fixed part is equipped with a first locking member on the side opposite to the rotating part, which enables locking in a mounting position. The rotating part is equipped with a second locking member for securely fastening the photographic device on the side opposite to the fixed part.

The term "mounting position" refers to the location where the adapter is installed, typically on various support structures. By mounting the photographic device on the adapter and installing the adapter in different mounting positions, the shooting angle can be adjusted accordingly.

By utilizing the adapter including the fixed part and the rotating part, along with the second locking member, the shooting angle of the photographic device can be adjusted by installing it on the adapter. Furthermore, the first locking member allows for the installation of the adapter in different mounting positions, providing additional adjustment of the shooting angle. This overall structure is simple and facilitates easy adjustment of the shooting angle.

Additionally, the adapter includes an adapter pivot, which enables rotational connection between the rotating part and the fixed part.

Moreover, the fixed part is equipped with a second positioning pin on the side facing the rotating part. The second positioning pin has a fourth through-hole in the middle. The rotating part has a first mounting hole, through which the second positioning pin passes. The fourth through-hole aligns with the first mounting hole. The adapter pivot is inserted sequentially into the fourth through-hole and the first mounting hole, enabling rotational movement of the rotating part relative to the fixed part.

Furthermore, the adapter comprises a first locking limit part. The sidewall of the rotating part is provided with a fifth through-hole, through which the first locking limit part passes to lock or release the rotating part and the fixed part. This prevents or allows the rotation of the rotating part relative to the fixed part.

Furthermore, the first locking limit part is threadedly connected to the fifth through-hole, enabling it to move closer to or away from the second positioning pin. When the first locking limit part is tightened, it presses against the second positioning pin, restricting the rotation of the rotating part relative to the fixed part. Conversely, when the first locking limit part is loosened, it moves away from the second positioning pin, allowing the rotating part to rotate relative to the fixed part and adjust the direction.

Furthermore, the first locking limit part comprises a reset spring, a button, a first limiting bar, and a fixed block. One end of the first limiting bar is connected to the button, which protrudes from the outer side of the rotating part's sidewall. The other end of the first limiting bar features a limiting protrusion, and the first limiting bar is movably connected to the fixed block. The reset spring is placed on the first limiting bar and connected to the fixed block and the button at both ends. The fixed part's side facing the rotating part is equipped with multiple first limiting grooves inclined toward the center of the fixed part. When the button is pressed, it moves the limiting protrusion of the first limiting bar along the fourth through-hole. Due to the presence of the inclined first limiting grooves, the contact area between the limiting protrusion and the fixed part gradually decreases until there is no contact. As a result, the rotating part can rotate relative to the fixed part. This presents an alternative structure for limiting the rotation of the rotating part relative to the fixed part. Compared to the structure where the first locking limit part is threadedly connected to the fifth through-hole, moving closer to or away from the second positioning pin, the aforementioned structure centered around the button allows for more convenient and rapid switching between the rotation and locking of the rotating part and the fixed part.

Furthermore, the fixed part is equipped with a limiting portion movably connected to the fixed part, while the rotating part facing the fixed part features multiple corresponding second limiting grooves for receiving the limiting portion. This configuration allows for the limiting portion to be pushed down or compressed when transitioning to vertical shooting mode, enabling the rotating part to rotate 180° relative to the fixed part.

Moreover, the limiting portion comprises a toggle block, a first limiting block, and a first limiting spring. The fixed part includes interconnected first mounting slots and second mounting slots. The first limiting spring and the first limiting block are positioned within the first mounting slots, with the first limiting spring situated between the first limiting block and the bottom of the first mounting slot. The first limiting block partially protrudes from the fixed part, and one end of the toggle block connects to the first limiting block, while the other end extends from the fixed part. This arrangement allows the retraction of the first limiting block into the first mounting slot when the toggle block is operated, facilitating rotation of the rotating part relative to the fixed part. Releasing the toggle block causes the first limiting block to return to its original position, protruding from the fixed part and engaging with the second limiting groove, thereby preventing rotation of the rotating part relative to the fixed part.

Additionally, the first locking member comprises a first locking latch, a first locking part, and a first locking pin. The first locking pin's one end is equipped with a fluted disc that engages with the first locking latch. The other end of the first locking pin is threadedly connected to the first locking part, with the first locking pin also being threadedly connected to the first positioning pin. The fixed part includes a third mounting slot, and one end of the fixed part opposite the third mounting slot features a first clamping block. The first locking part is positioned within the third mounting slot, creating a first clamping space with the first clamping block. In this embodiment, rotating the first locking latch drives the first locking pin to tighten its connected end, causing the first locking part to move closer to the slot's bottom and engage with the first clamping block, effectively securing the fixed part to the support component.

Furthermore, the first locking part comprises a third limiting groove, and the bottom of the third mounting slot protrudes a first positioning pin that fits within the third limiting groove. This configuration prevents wobbling of the first locking part.

Moreover, the support component features slide grooves on both sides, and the first locking part and the first clamping block slide within these grooves. When tightened by the first locking latch, the fixed part can be locked at any position within the slide grooves.

Additionally, the bottom of the first clamping space contains a first elongated hole, while the side of the fixed part is equipped with a fourth mounting slot that communicates with the first elongated hole. The connecting mechanism includes a second limiting block and a first pressing block, with the first pressing block positioned within the fourth mounting slot and a second limiting spring situated between the fourth mounting slot and the bottom of the first pressing block. The second limiting block fits within the first elongated hole and protrudes into the first clamping space. The support component incorporates a clearance groove, where the clearance groove, located on the side of the slot arm away from the connecting component, includes a limiting hook to prevent contact with the second limiting block. The limiting hook ensures the fixed part remains on the support component. Specifically, an unlocking passage exists between the limiting hook and the opposite wall of the clearance groove. When the first pressing block is pressed, it causes the second limiting block to slide relative to the first elongated hole. If the fixed part is removed from the support component at this time, the second limiting block can slide off through the unlocking passage. If the first pressing block is not pressed, the limiting hook restricts the movement of the second limiting block, preventing detachment of the fixed part. In another embodiment, the first clamping space features a resiliently equipped third limiting block, and the end of the clearance groove contains a limiting hole. When the fixed part slides within the clearance groove, the third limiting block is compressed. Once the fixed part reaches the end of the slot, the third limiting block movably protrudes into the limiting hole, preventing detachment.

Furthermore, the second locking member comprises a second locking latch, a second locking part, and a second locking pin. One end of the second locking pin is equipped with a fluted disc that engages with the second locking latch. The other end of the second locking pin is threadedly connected to the second locking part, while the rotating part includes a fifth mounting slot. One end of the rotating part opposite the fifth mounting slot features a second clamping block. The second locking part is positioned within the fifth mounting slot, forming a second clamping space with the second clamping block. During operation, tightening the second locking latch drives the second locking pin to tighten its connected end threadedly, causing the second locking part to move closer to the second locking plate and the bottom of the fifth mounting slot, engaging with the second clamping block and securely locking external photographic equipment, such as a camera's quick release plate or a cage for mounting a camera.

To achieve the aforementioned objectives, the present disclosure provides a connection structure with an adapter, comprising a first connecting part, a second connecting part, and the aforementioned adapter. The first connecting part and the second connecting part are interconnected, and both feature mounting positions, with the adapter detachably connected to these positions. Preferably, both the first connecting part and the second connecting part have a rod-shaped structure.

In the present disclosure, the adapter is detachably connected to mounting positions, allowing for the switching of the adapter's angle by disassembling and installing it on different mounting positions. This, in turn, enables the adjustment of the shooting angle of the photographic device mounted on the adapter.

Moreover, the first connecting part incorporates a sliding position, and the second connecting part is slidably connected to this sliding position. By implementing a sliding connection between the first connecting part and the second connecting part, the dimensions for adjusting shooting distance and angle can be further enhanced.

Furthermore, either the first connecting part or the second connecting part is equipped with a sliding locking piece to restrict the sliding motion between them. When the first connecting part and the second connecting part reach a specified position, the sliding locking piece can engage to lock them in place. Conversely, when sliding is required, the sliding locking piece can be unlocked. The sliding locking piece can be realized using a spring in cooperation with a positioning pin and a positioning slot, or it can be implemented as a threaded rotating locking and loosening structure.

To achieve the aforementioned objectives, the present disclosure provides a photographic device that adopts the connection structure with an adapter described above.

Compared to the prior art, the advantages of the present disclosure are as follows: By employing the adapter as a fixed part and a rotating part, and incorporating a second locking member, the photographic device's angle adjustment can be achieved through the movement between the fixed part and the rotating part after mounting the photographic device on the adapter. Additionally, by utilizing the first locking member, the adapter can be installed on different mounting positions, further allowing for adjustment of the shooting angle. The overall structure is simple and facilitates easy adjustment of the shooting angle.

BRIEF DESCRIPTION OF THE DRAWINGS

In order to more clearly illustrate aspects of the present disclosure or the technical schemes in the prior art, the drawings used in the description of exemplary embodiments will be briefly introduced below. Obviously, the drawings in the following description are only examples of the present disclosure. For those ordinarily skilled in the art, other implementations can be obtained according to the structures shown in these drawings.

DETAILED DESCRIPTION

Figure 1:
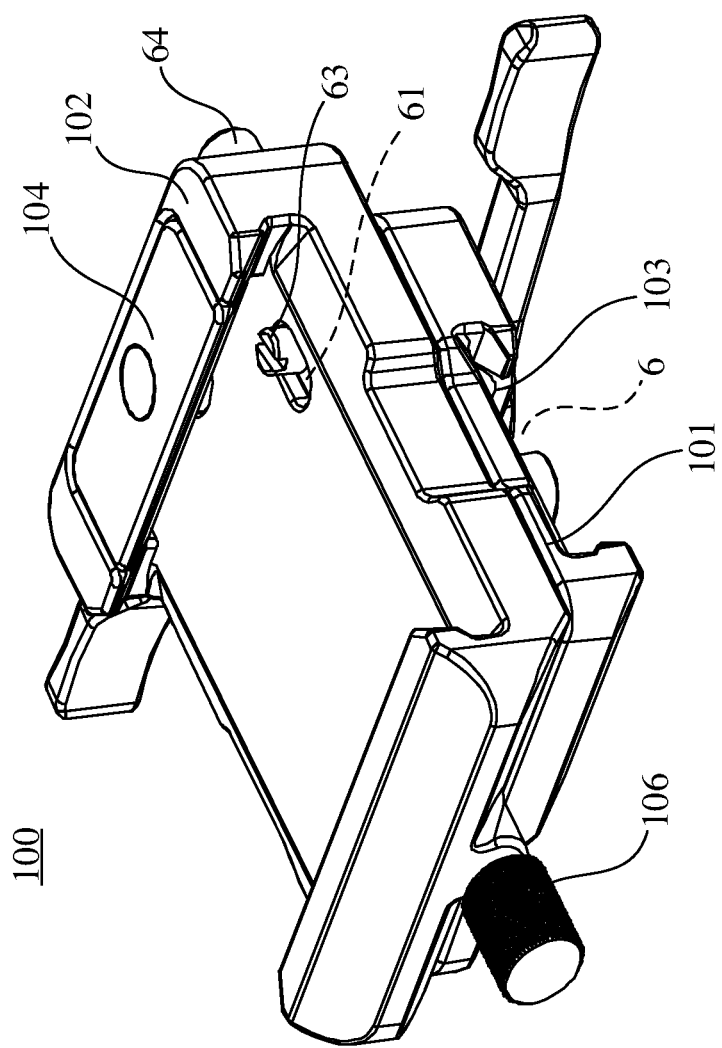
FIG. 1 is a first perspective structural schematic diagram of an adapter according to a first embodiment.
Figure 2:
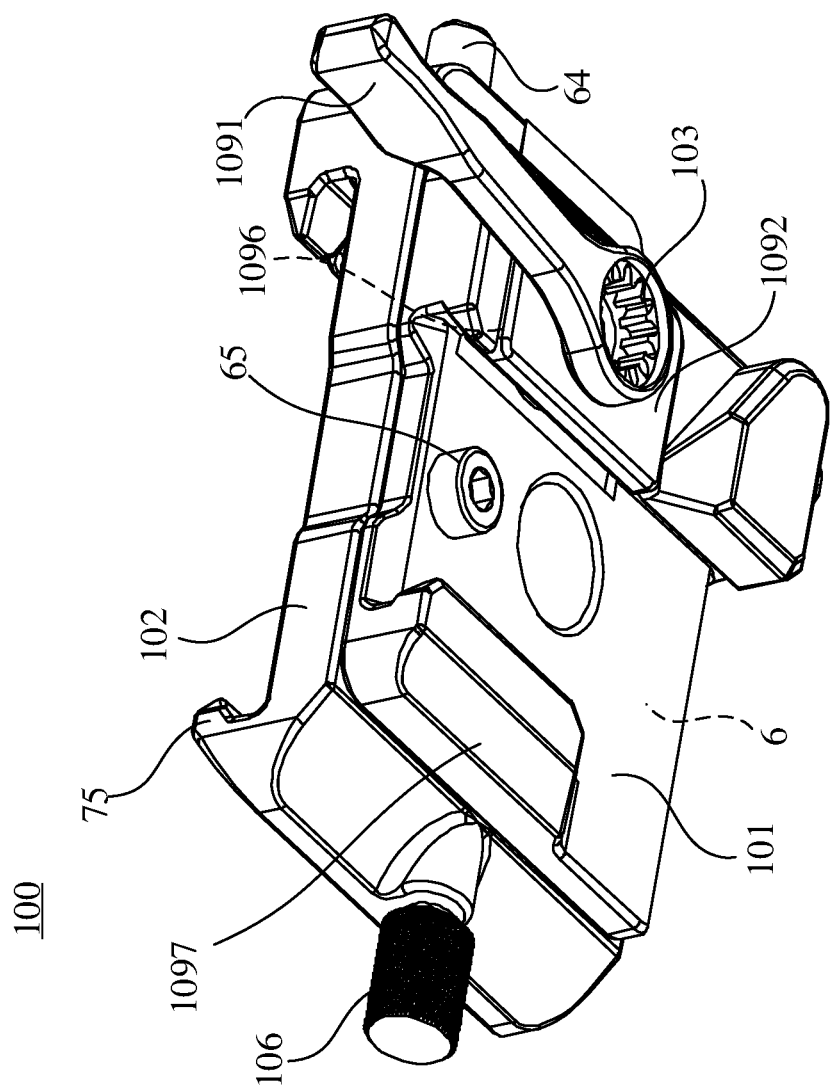
FIG. 2 is a second perspective structural schematic diagram of the adapter according to the first embodiment.
Figure 3:
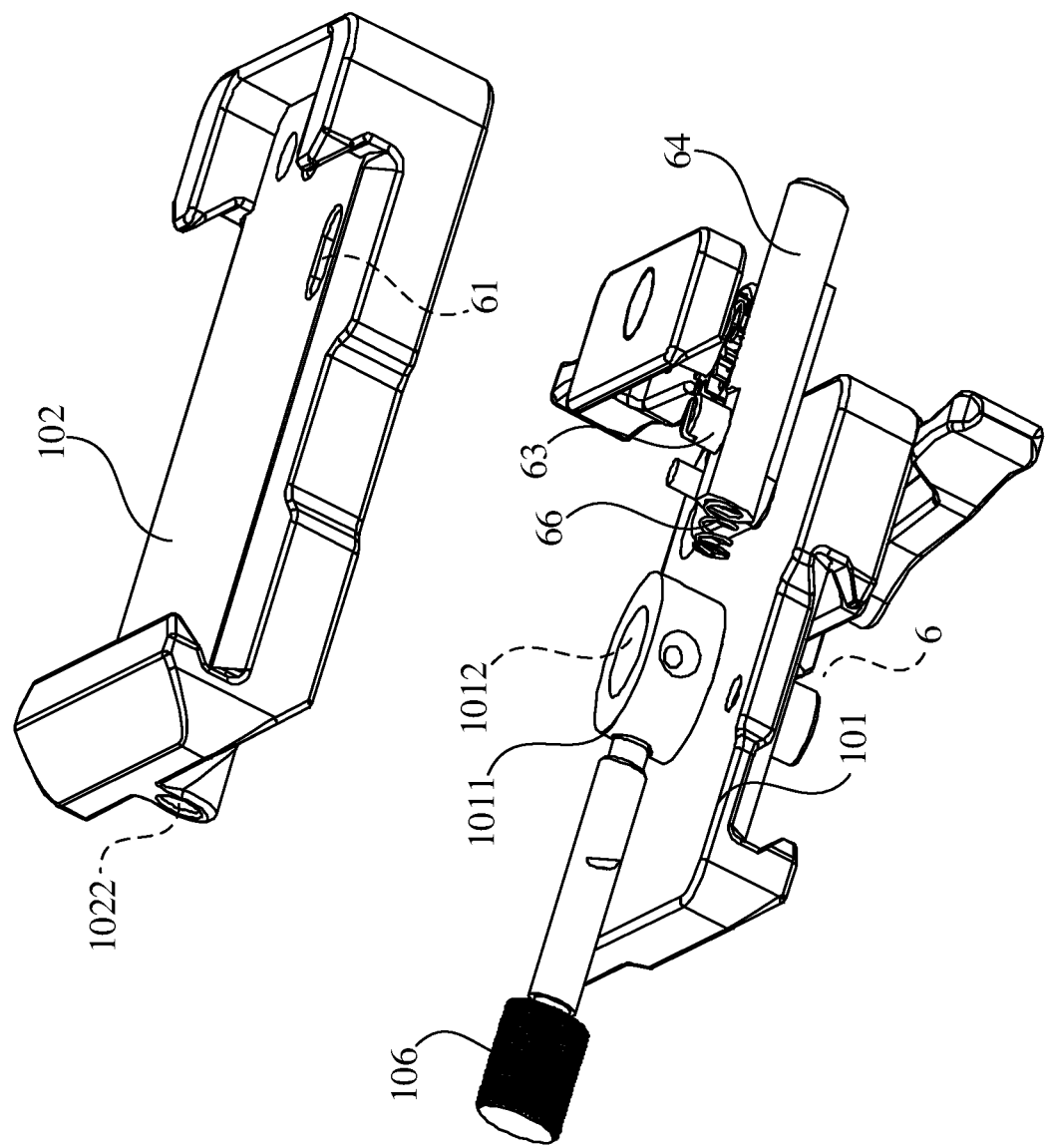
FIG. 3 is a first perspective exploded view of the adapter according to the first embodiment.
Figure 4:
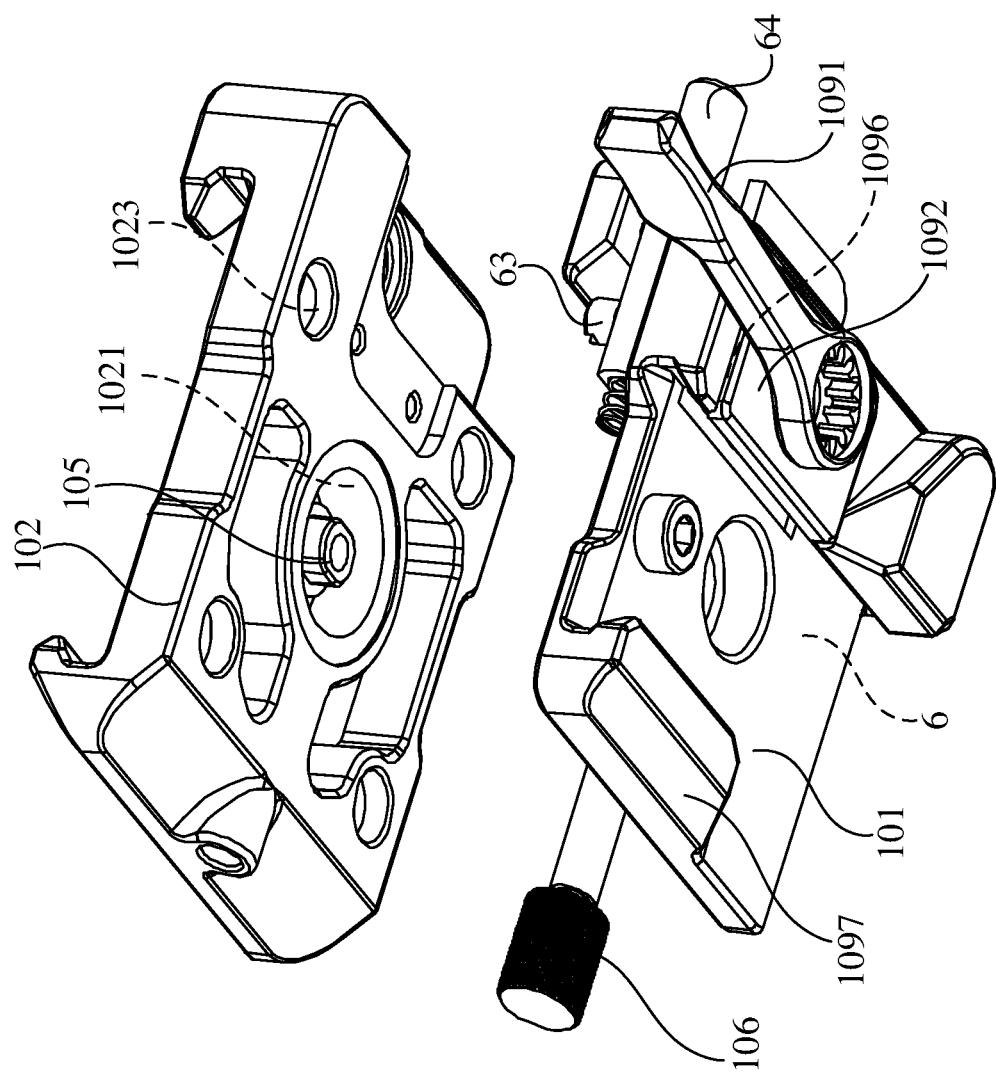
FIG. 4 is a second perspective exploded view of the adapter according to the first embodiment.
Figure 5:
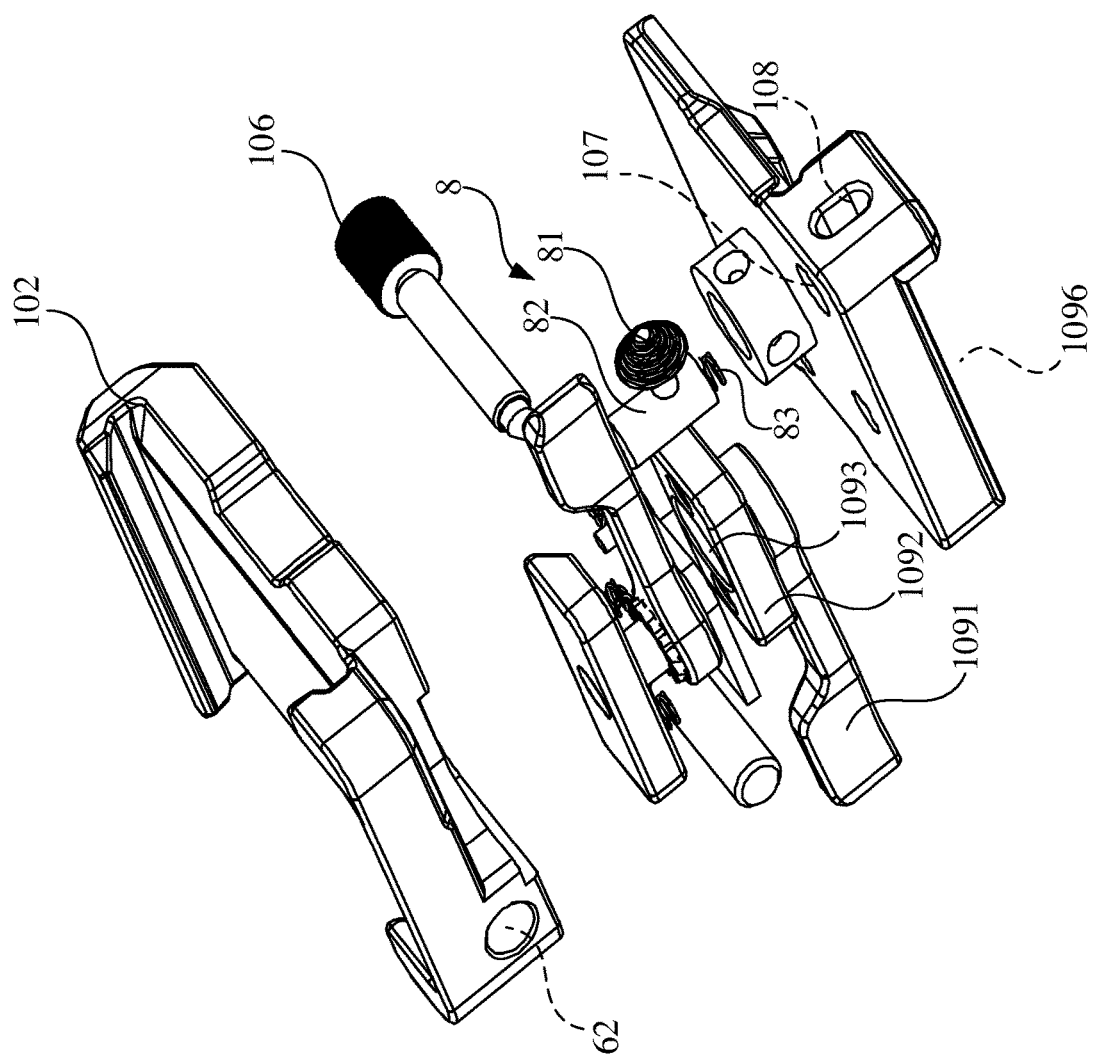
FIG. 5 is a third perspective exploded view of the adapter according to the first embodiment.
Figure 6:
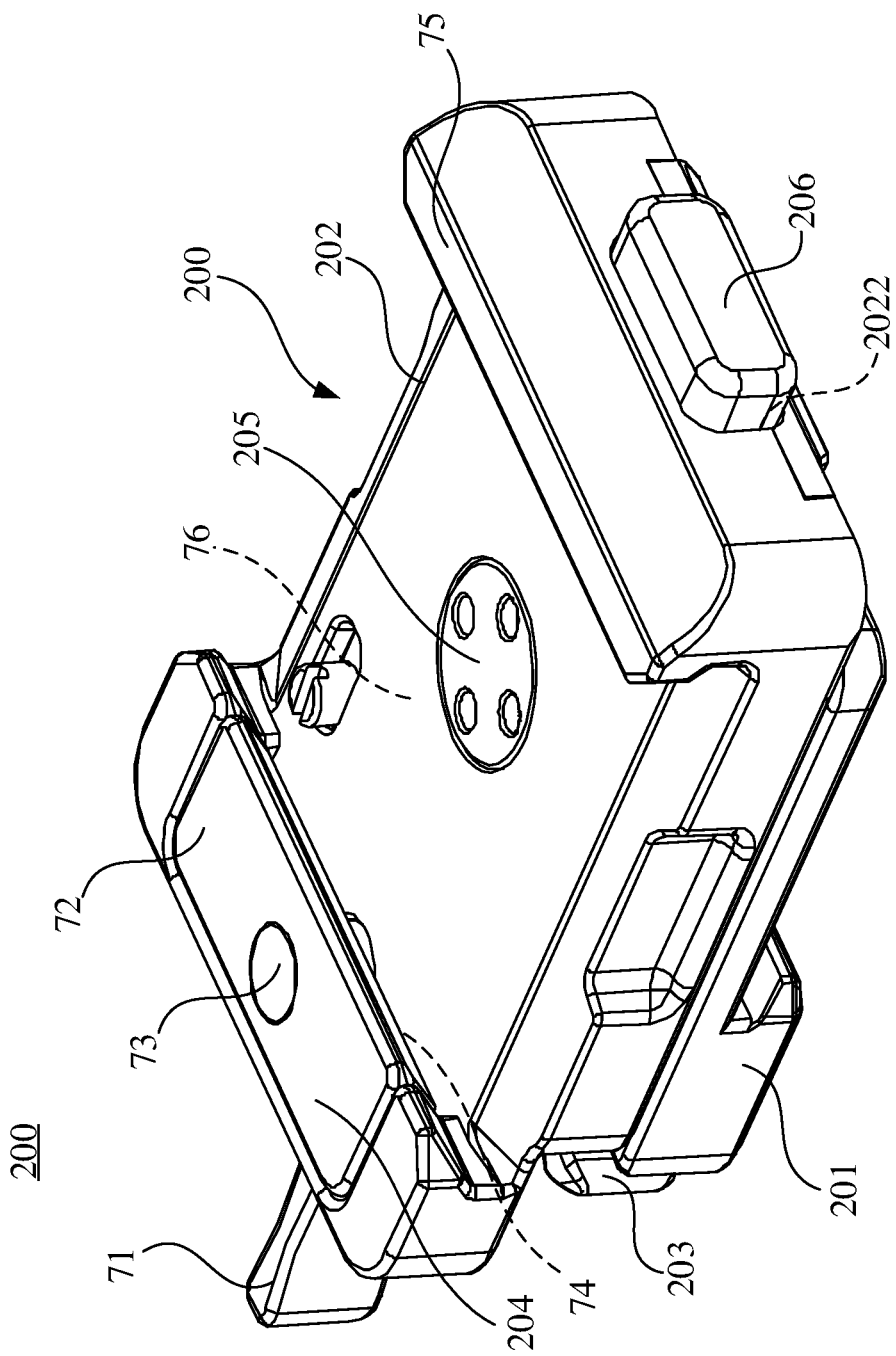
FIG. 6 is a first perspective structural schematic diagram of an adapter according to a second embodiment.
Figure 7:
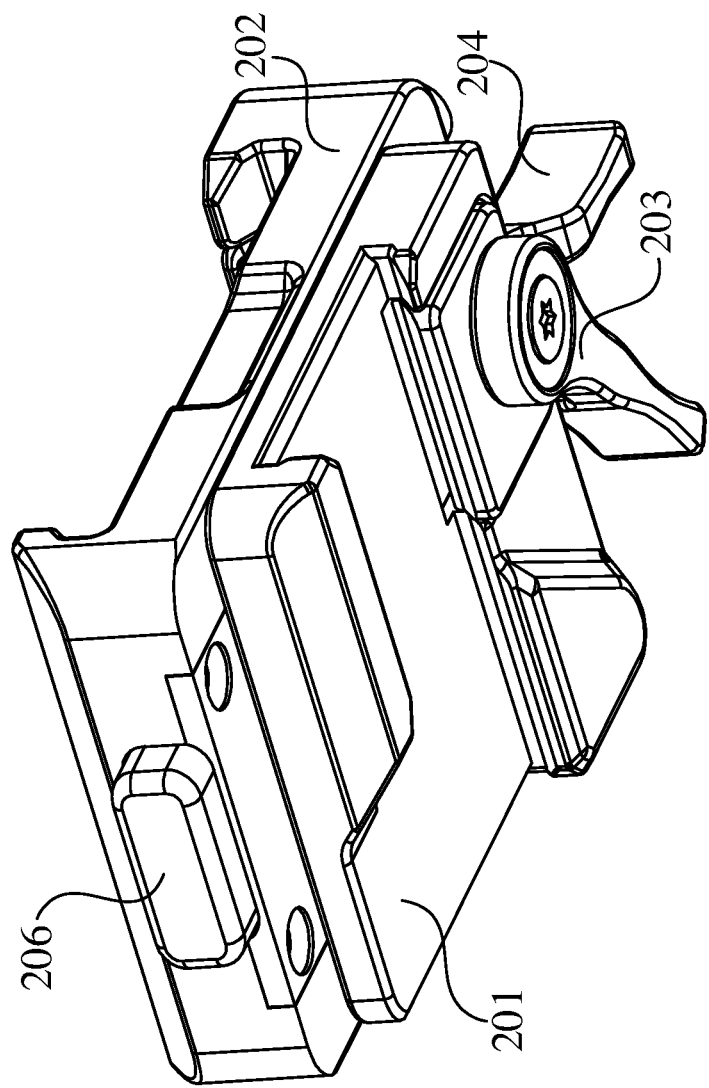
FIG. 7 is a second perspective structural schematic diagram of the adapter according to the second embodiment.
Figure 8:
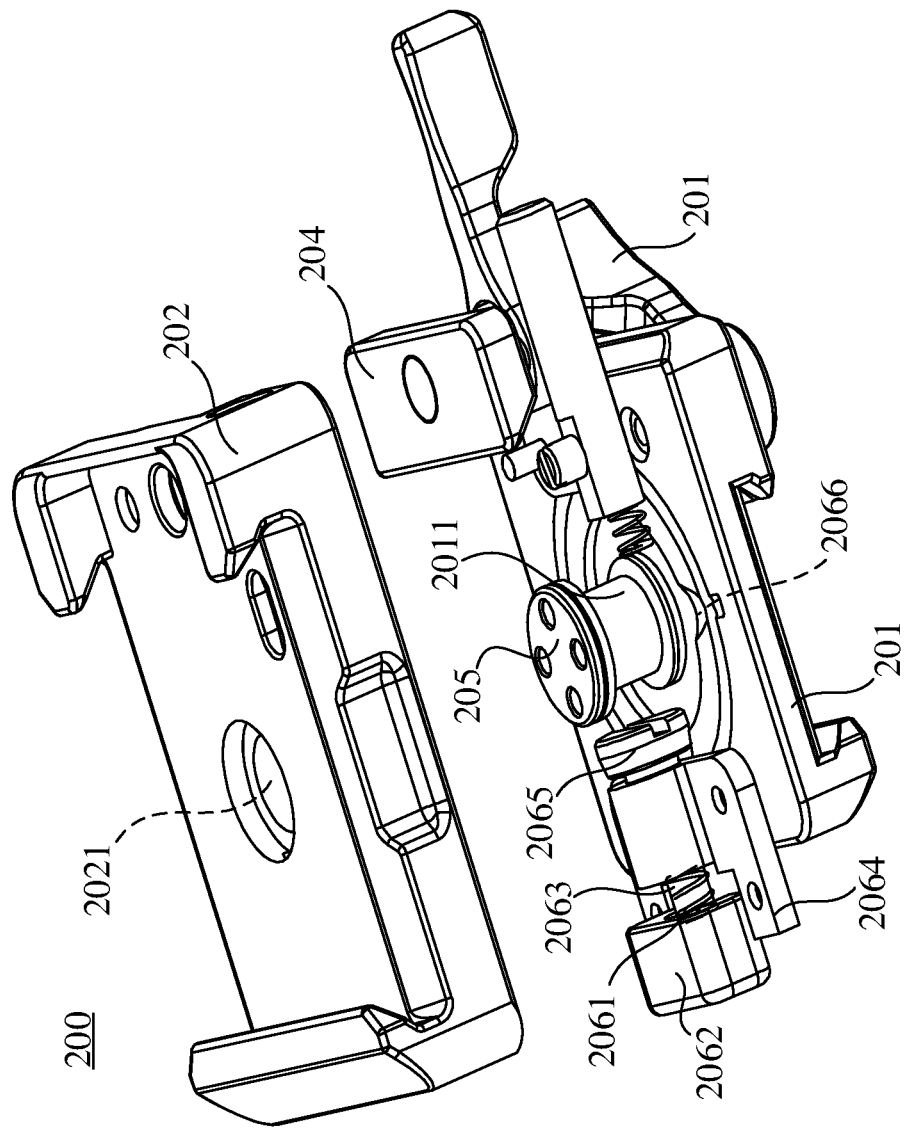
FIG. 8 is a first perspective exploded view of the adapter according to the second embodiment.
Figure 9:
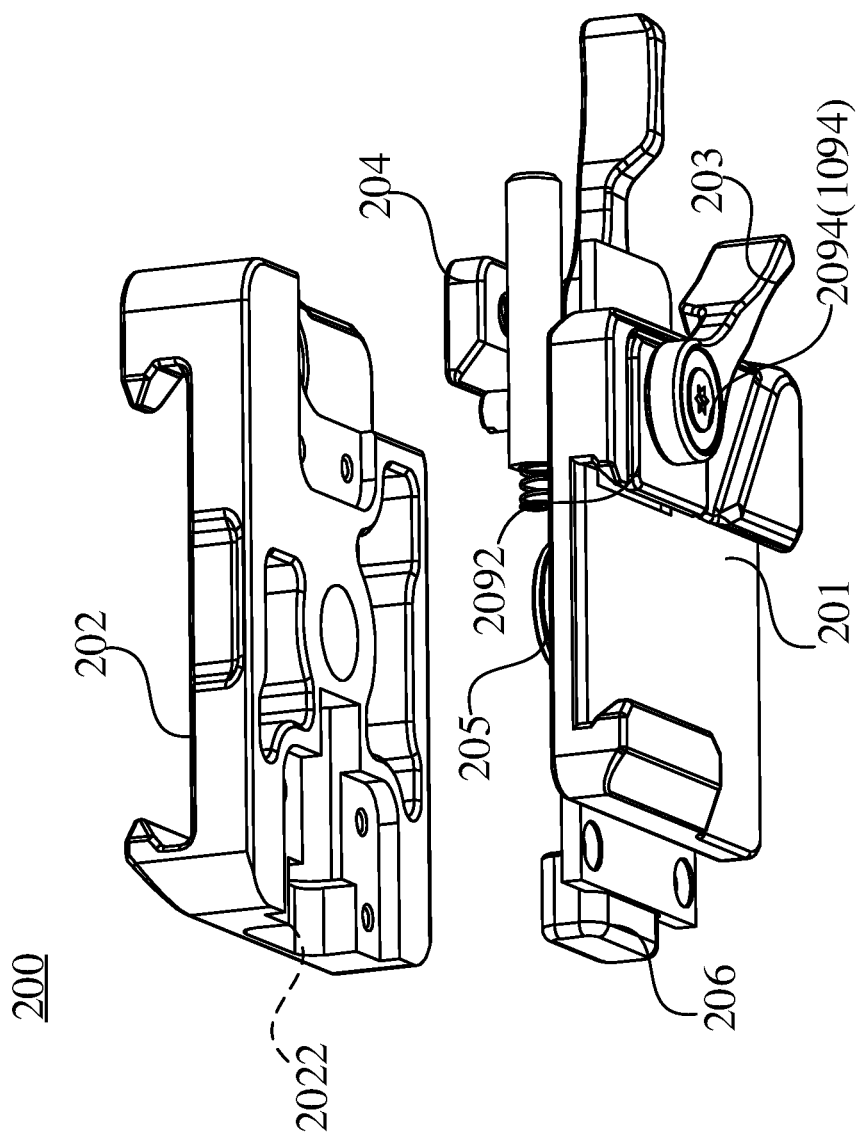
FIG. 9 is a second perspective exploded view of the adapter according to the second embodiment.
Figure 10:
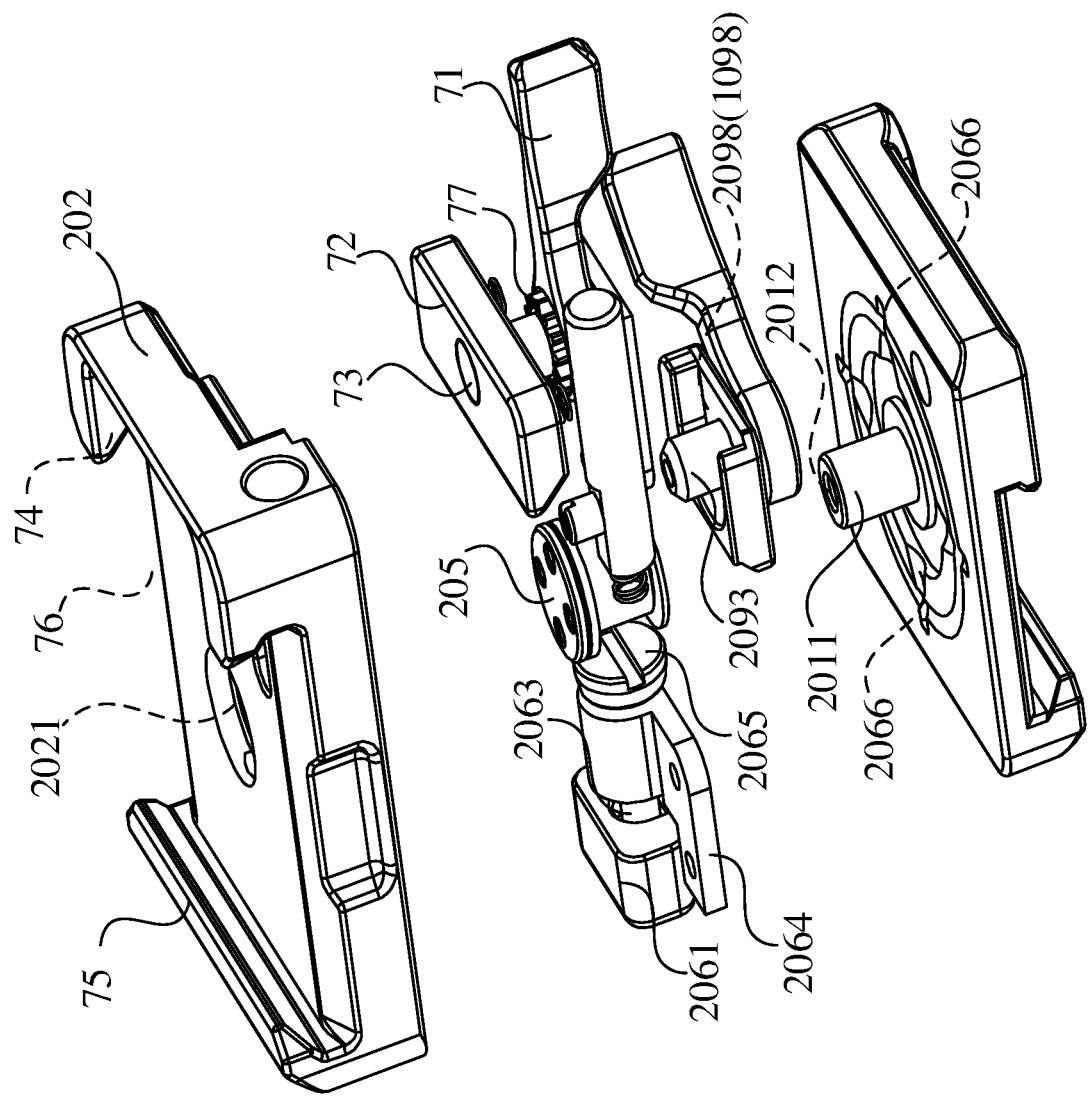
FIG. 10 is a third perspective exploded view of the adapter according to the second embodiment.
Figure 11:
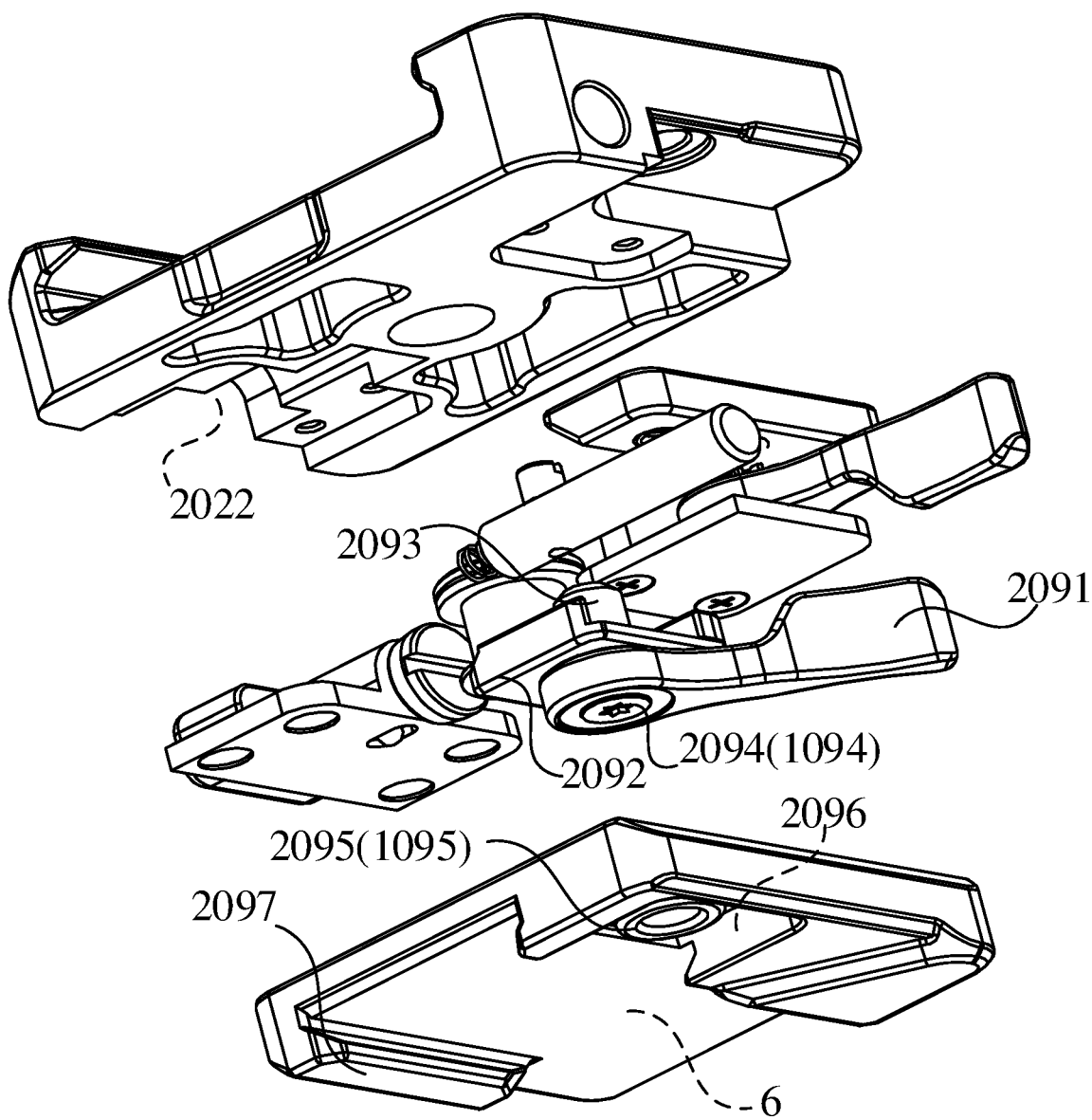
FIG. 11 is a fourth perspective exploded view of the adapter according to the second embodiment.

In order to make the object, technical schemes, and advantages of the present disclosure clearer, the present disclosure will be further described in detail with reference to the accompanying drawings and embodiments. It should be understood that the specific embodiments described here are intended for illustrating the present disclosure, but not for limiting the present disclosure.

First Exemplary Embodiment

Referring to FIGS. 1-5 10-11 and 12-14, an adapter 100 comprises a fixed part 101 and a rotating part 102 that are movably connected together. The fixed part 101 is equipped with a first locking member 103 on the side facing away from the rotating part 102 for securing it in the mounting position 11, while the rotating part 102 is furnished with a second locking member 104 on the side facing away from the fixed part 101 for locking the photographic device. The fixed part 101 and the rotating part 102 are rotatably and movably connected through an adapter pivot shaft 105.

In this embodiment, the fixed part 101 and the rotating part 102 are rotatably connected through an adapter pivot shaft 105 included in the adapter 100.

In this embodiment, the fixed part 101 is equipped with a second positioning pin 1011 on the side facing the rotating part 102, which includes a fourth through-hole 1012 in the center. The rotating part 102 is provided with a first mounting hole 1021 through which the second positioning pin 1011 passes, establishing communication between the fourth through-hole 1012 and the first mounting hole 1021. The adapter pivot shaft 105 passes sequentially through the fourth through-hole 1012 and the first mounting hole 1021, allowing the rotating part 102 to rotate with respect to the fixed part 101.

Furthermore, in this embodiment, the adapter 100 includes a first locking limiting part 106. The side wall of the rotating part 102 is also furnished with a fifth through-hole 1022 through which the first locking limiting part 106 passes to lock or release the rotating part 102 and the fixed part 101. This arrangement facilitates preventing or supporting the rotation of the rotating part 102 relative to the fixed part 101.

The first locking limiting part 106 is threadedly connected to the fifth through-hole 1022, allowing it to move closer to or away from the second positioning pin 1011. Tightening the first locking limiting part 106 causes it to abut against the second positioning pin 1011, restricting the rotation of the rotating part 102 relative to the fixed part 101. Conversely, loosening the first locking limiting part 106 enables it to move away from the second positioning pin 1011, thereby allowing the rotating part 102 to rotate with respect to the fixed part 101 for adjusting the direction.

Additionally, the fixed part 101 in this embodiment is equipped with limiting portion 8 that is movably connected to it. The limiting portion 8 can move up and down relative to the fixed part 101. The rotating part 102 is provided with multiple second limiting grooves 1023 (e.g., cavities) corresponding to the limiting portion 8 on the side facing the fixed part 101. This configuration allows compression of the limiting portion 8 when switching to a vertical shooting mode, enabling the rotating part 102 to rotate 180° relative to the fixed part 101.

The limiting portion 8 includes a toggle block 81, a first limiting block 82, and a first limiting spring 83. The fixed part 101 is furnished with a first mounting slot 107 connected with a second mounting slots 108. The first limiting spring 83 and the first limiting block 82 are positioned in the first mounting slot 107, with the first limiting spring 83 located between the first limiting block 82 and the bottom of the first mounting slot 107. The first limiting block 82 partially protrudes from the fixed part 101, and one end of the toggle block 81 is connected to the first limiting block 82, while the other end protrudes from the fixed part 101. In this arrangement, when the toggle block 81 is toggled, the first limiting block 82 retracts into the first mounting slot 107, enabling the rotating part 102 to rotate relative to the fixed part 101. Releasing the toggle block 81 causes the first limiting block 82, pushed by the first limiting spring 83, to protrude from the fixed part 101 and engage with the second limiting groove 1023, preventing the rotating part 102 from rotating relative to the fixed part 101.

In this embodiment, the first locking member 103 comprises a first locking latch 1091, a first locking part 1092, and a first locking pin 1093. One end of the first locking pin 1093 is equipped with a fluted disc 1094 that engages with the first locking latch 1091. The other end of the first locking pin 1093 is threadedly connected to the first locking part 1092, and the first locking pin 1093 is also threadedly connected to the first positioning pin 1095 on the fixed part 101. The fixed part 101 is further provided with a third mounting slot 1096, and the opposite end of this slot is equipped with a first clamping block 1097. The first locking part 1092 is positioned within the third mounting slot 1096, creating a first clamping space 6 together with the first clamping block 1097. In this embodiment, as the third mounting slot 1096 rotates, the first locking pin 1093, being threadedly connected to the first locking part 1092, is tightened at one end, causing the first locking part 1092 to move closer to the bottom of the slot. Ultimately, the first locking part 1092 engages with the first clamping block 1097, thereby securely fixing the fixed part 101 onto the first connecting part 1.

Moreover, in this embodiment, the first locking part 1092 in this embodiment is furnished with a third limiting groove 1098 (e.g., see FIG. 10), a first positioning pin 1095 (e.g., see FIG. 11) is provided to protrude from the bottom of the third mounting slot 1096, and the first positioning pin 1095 is accommodated within the third limiting groove 1098. This structural arrangement effectively prevents the first locking part 1092 from wobbling.

In this embodiment, to facilitate movement and adjustment, slide grooves 14 are provided on both sides of the first connection part 1. The first locking part 1092 and the first clamping block are slidably positioned within these slide grooves 14. When locked by the third mounting slot 1096, the fixed part 101 can be secured at any position within the slide grooves 14.

Furthermore, a first elongated hole 61 is provided at the bottom of the rotating part 102, and a fourth mounting slot 62 is located on the side of the rotating part 102. The first elongated hole 61 is connected to the fourth mounting slot 62. The connection mechanism also includes a second limiting block 63 and a first actuating block 64. The first actuating block 64 is accommodated within the fourth mounting slot 62, and a second limiting spring 66 is situated between the bottom of the fourth mounting slot 62 and the first actuating block 64. The second limiting block 63 is positioned within the first elongated hole 61 and protrudes into the rotating part 102.

Another implementation includes a first elongated hole 61 that may be provided at the bottom of the first clamping space 6, and a fourth mounting slot 62 is located on the side of the fixed part 101. The first elongated hole 61 is connected to the fourth mounting slot 62. The connection mechanism also includes a second limiting block 63 and a first actuating block 64. The first actuating block 64 is accommodated within the fourth mounting slot 62, and a second limiting spring 66 is situated between the bottom of the fourth mounting slot 62 and the first actuating block 64. The second limiting block 63 is positioned within the first elongated hole 61 and protrudes into the first clamping space 6. The first connection part 1 is designed with an clearance groove, and a limiting hook is set on the groove arm away from the end of the connection component. The clearance groove is intended to prevent interference with the second limiting block 63, while the limiting hook serves to prevent the first locking member 103 from slipping off the first connection part 1. More specifically, an unlocking channel is present between the limiting hook and the opposite side wall of the clearance groove. When the first actuating block 64 is pressed, it drives the second limiting block 63 to slide relative to the first elongated hole 61. If the fixed part 101 is removed from the first connection part 1 at this time, the second limiting block 63 can slide off through the unlocking channel. If the first actuating block 64 is not pressed, the limiting hook will restrict the movement of the second limiting block 63, preventing the fixed part 101 from slipping off the first connection part 1. Another implementation includes the provision of a third limiting block 65 movably positioned within the first clamping space 6 and a limiting hole placed at the end of the clearance groove. As the fixed part 101 slides into the clearance groove, the third limiting block 65 is compressed. When the fixed part 101 reaches the end, the third limiting block 65 movably protrudes into the limiting hole, thereby achieving an anti-detachment effect.

Second Exemplary Embodiment

Referring to FIGS. 6-14, an adapter 200 comprises a fixed part 201 and a rotating part 202 that are movably connected to each other. One side of the fixed part 201 opposite the rotating part 202 is equipped with a first locking member 203 for securing the mounting position 11, while one side of the rotating part 202 opposite the fixed part 201 features a second locking member 204 for locking the photographic device. The fixed part 201 and the rotating part 202 are rotatably connected to each other.

In this embodiment, an adapter pivot shaft 205 is included in the adapter 200 to establish the rotatable connection between the rotating part 202 and the fixed part 201 through it.

Moreover, the fixed part 201 is provided with a second positioning pin 2011 on the side facing the rotating part 202, and a fourth through-hole 2012 (e.g., one or more throughholes) is located in or near the center of the second positioning pin 2011. The rotating part 202 is furnished with a first mounting hole 2021, through which the second positioning pin 2011 passes. The fourth through-hole 2012 and the first mounting hole 2021 are in communication. The adapter pivot shaft 205 sequentially passes through the fourth through-hole 2012 and the first mounting hole 2021, allowing the rotating part 202 to rotate relative to the fixed part 201.

In this embodiment, the adapter 200 comprises a first locking limiting part 206 and a fifth through-hole 2022 on the side wall of the rotating part 202. The first locking limiting part 206 passes through the fifth through-hole 2022 to secure or release the rotation of the rotating part 202 relative to the fixed part 201, thereby controlling its movement.

The first locking limiting part 206 in this embodiment includes a reset spring 2061, a button 2062, a first limiting bar 2063, and a fixed block 2064. The button 2062 protrudes from the outer side of the side wall of the rotating part, and one end of the first limiting bar 2063 is connected to the button 2062. The other end of the first limiting bar 2063 has a limiting protrusion 2065 and is movably connected to the fixed block 2064. The reset spring 2061 is positioned on the first limiting bar 2063 and connected to the fixed block 2064 and the button 2062 on both ends. The fixed part 201 is equipped with multiple inclined first limiting grooves 2066 facing the second positioning pin 2011. Pressing the button 2062 causes the limiting protrusion 2065 of the first limiting bar 2063 to move along the fifth through-hole 2022 and the inclined first limiting grooves 2066. Due to the inclined first limiting grooves 2066, the contact area between the limiting protrusion 2065 and the fixed part gradually decreases until there is no contact. Consequently, the rotating part 202 can rotate relative to the fixed part 201. This structure, which restricts the rotation of the rotating part 202 relative to the fixed part 201, provides a more convenient and quicker switch between the rotation and locking of the rotating part 202 and the fixed part 201 than the first embodiment.

The connection mechanism in this embodiment also includes a first locking latch 2091, a first locking part 2092, and a first locking pin 2093. One end of the first locking pin 2093 is equipped with a fluted disc 2094, engaging with the first locking latch 2091. The other end of the first locking pin 2093 is threadedly connected to the first locking part 2092, and it is also threadedly connected to a third positioning pin 2095. The fixing part 201 has the third mounting slot 2096, and the opposite end of the fixing part 201 is equipped with a first clamping block 2097. The first locking part 2092 is positioned within the third mounting slot 2096, forming a first clamping space 6 in conjunction with the first clamping block 2097. In this embodiment, when the first locking latch 2091 rotates, the first locking pin 2093, connected to the first locking part 2092, tightens and moves the first locking part 2092 towards the bottom of the slot. Ultimately, the first locking part 2092 engages with the first clamping block 2097, securely fixing the fixing part 201 onto the supporting component.

In this embodiment, the first locking part 2092 includes a third limiting groove (not shown in the drawing), and the bottom of the third mounting slot 2096 protrudes to accommodate a third positioning pin 2095, which fits within the third limiting groove. This configuration prevents any wobbling of the first locking part 2092.

In this embodiment, the supporting component 1 is equipped with slide grooves 14 on both sides, where the first locking part 2092 and the first clamping block are slidably arranged. When the fixing part 201 is locked via the third mounting slot 2096, it can be secured at any position within the slide grooves 14.

In this embodiment, the connection mechanism involves a second locking latch 71, a second locking part 72, and a second locking pin 73. One end of the second locking pin 73 is equipped with a fluted disc that engages with the second locking latch 71. The other end of the second locking pin 73 is threadedly connected to the second locking part 72. The rotating part 202 is also equipped with a fifth mounting slot 74, and the end of the rotating part 202 opposite to the fifth mounting slot 74 features a second clamping block 75. The second locking part 72 is positioned within the fifth mounting slot 74, creating a second clamping space 76 in conjunction with the second clamping block 75. In operation, the second locking latch 71 drive the thread on the end between the second locking pin 73 and the second locking part 72 to be tighten through the meshing teeth, causing the second locking part 72 to move closer to the second locking latch 71. Consequently, the second locking part 72 descends towards the bottom of the fifth mounting slot 74 and ultimately engages with the second clamping block 75, securely locking external shooting devices such as a camera quick release plate or a camera cage.

Third Exemplary Embodiment

Figure 12:
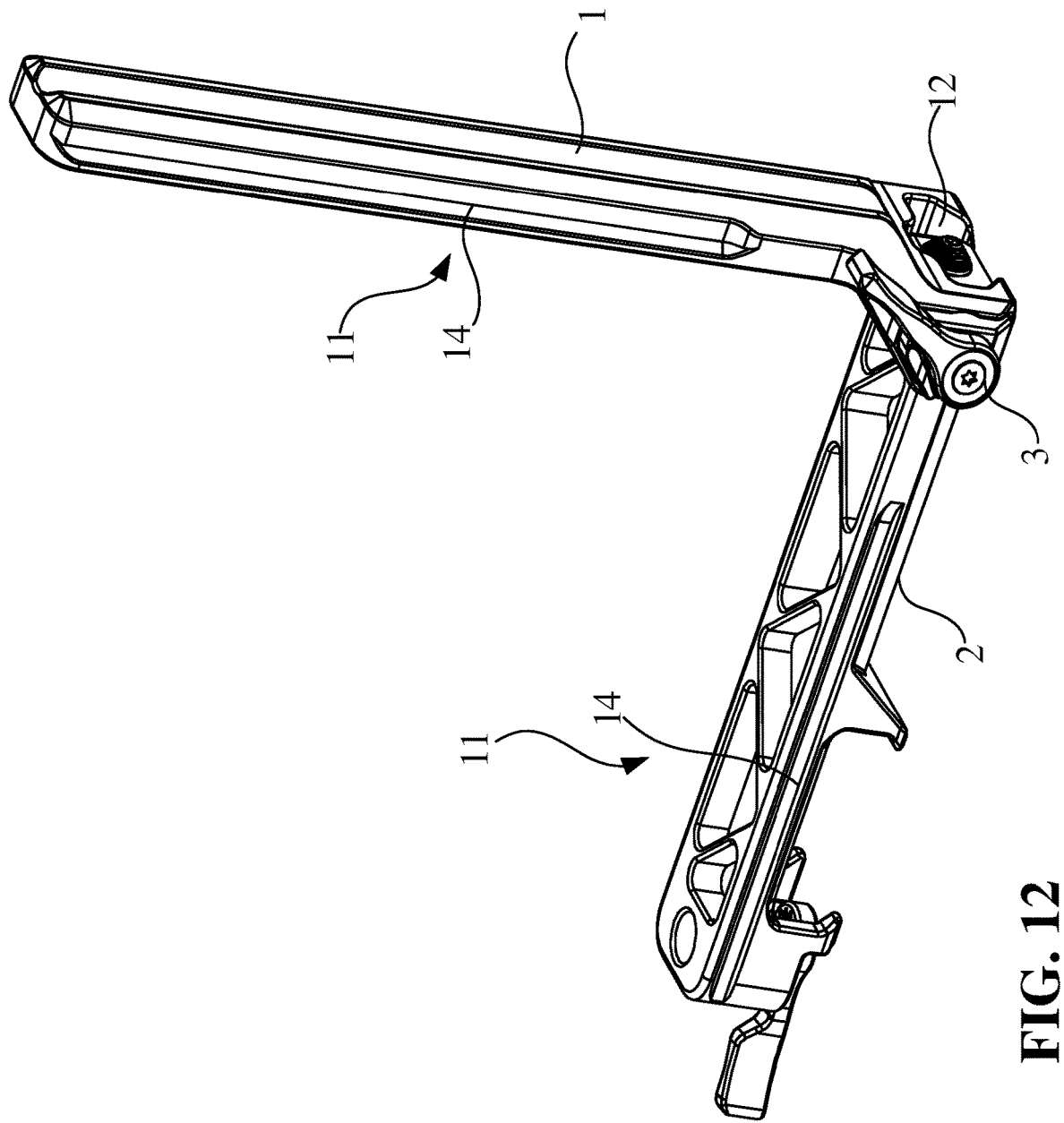
FIG. 12 is a first perspective structural schematic diagram of a connecting structure according to a third embodiment.
Figure 13:
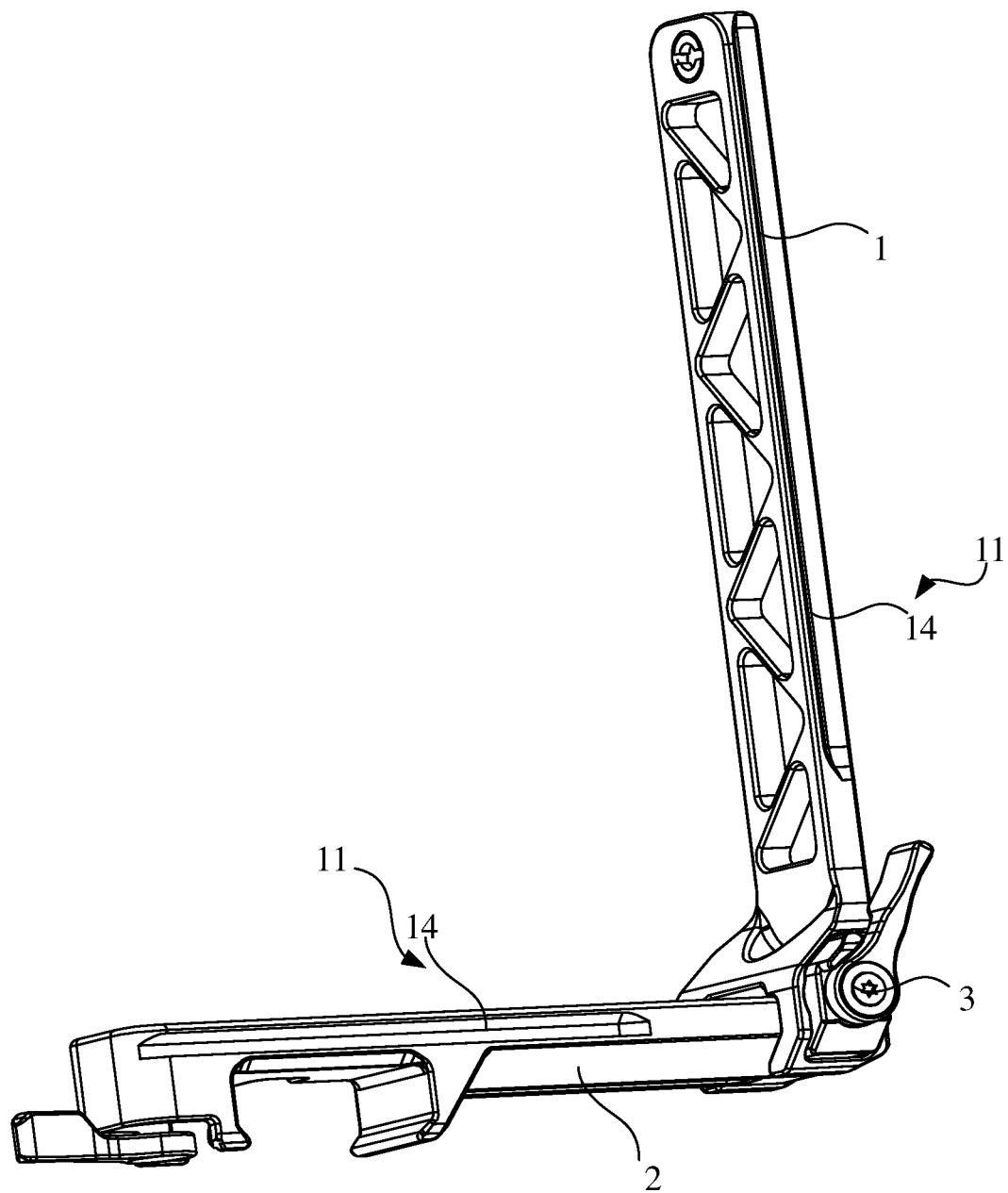
FIG. 13 is a second perspective structural schematic diagram of the connecting structure according to a third embodiment.
Figure 14:
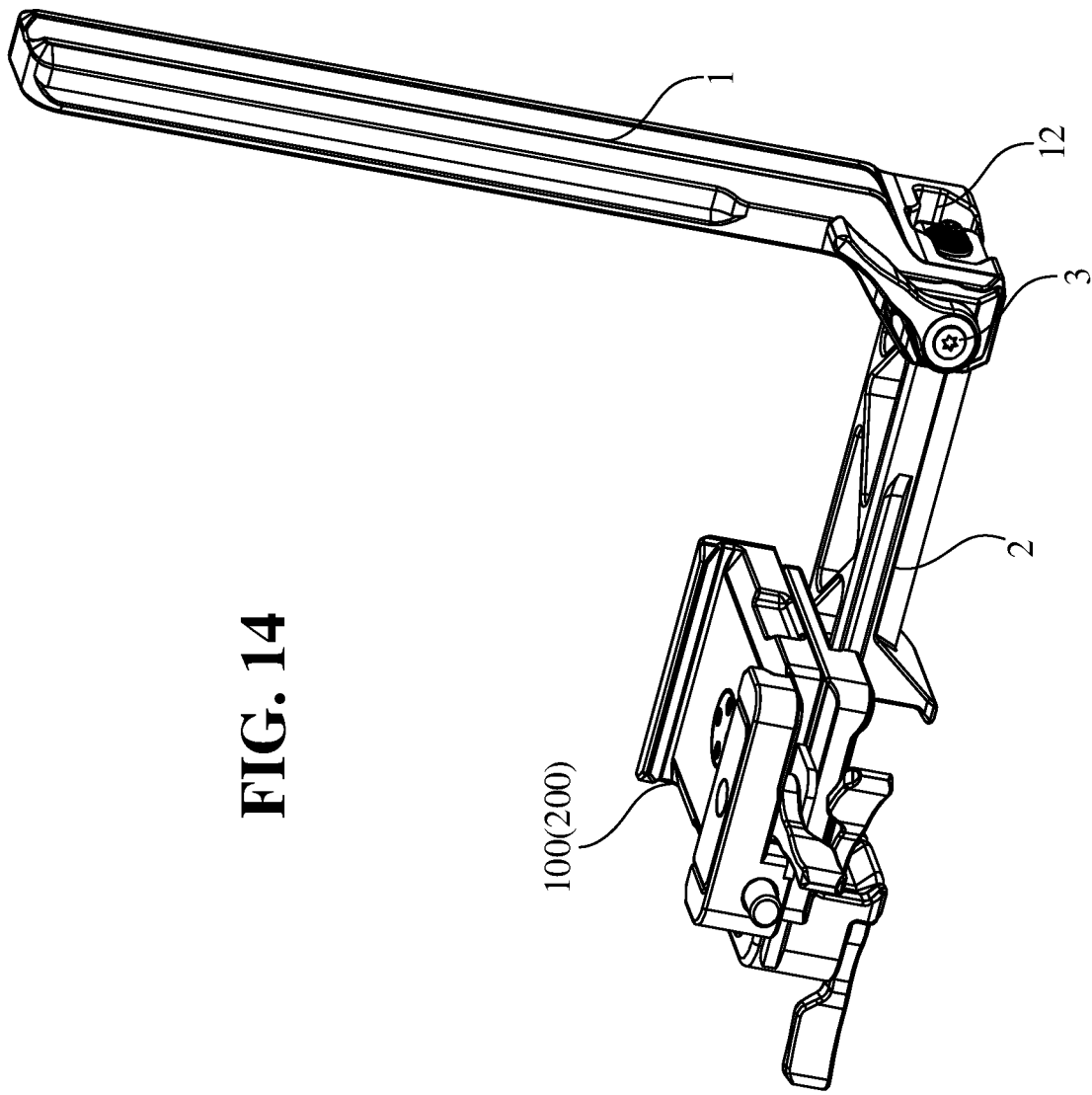
FIG. 14 is a schematic diagram of the connecting structure with an adapter installed according to the third embodiment.
Figure 15:
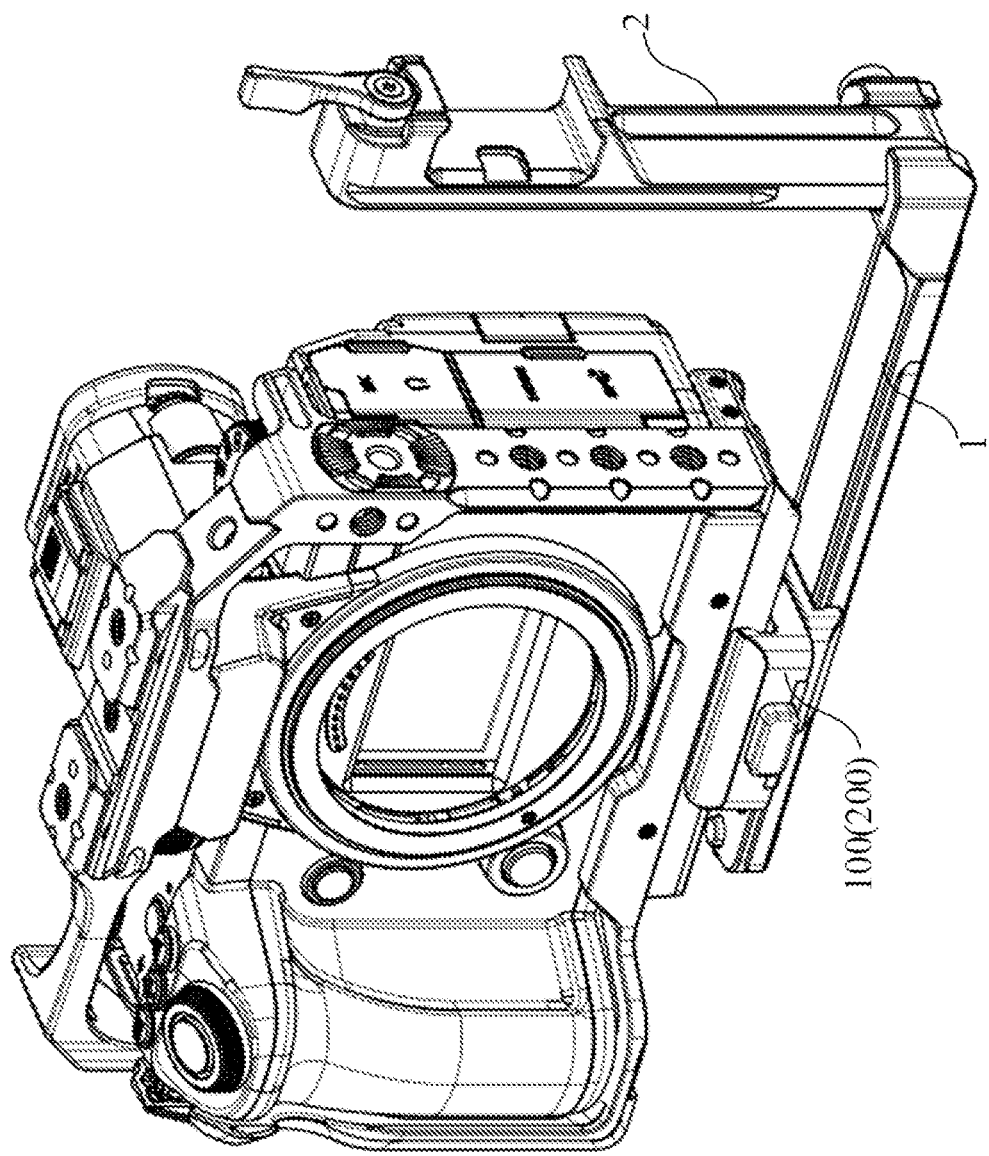
FIG. 15 is a schematic diagram of a photographic device installed on the adapter of FIGS. 13 and 14.

Referring to FIGS. 12-14, the third exemplary embodiment involves a connecting structure with an adapter, including a first connection part 1, a second connection part 2, and the adapter according to either the first embodiment or second embodiment described above. The first connection part 1 and the second connection part 2 are connected together, and both have mounting positions 11, where the mounting positions 11 are provided with slide groove 14.

The adapter can be detachably connected to these mounting positions 11, enabling shooting angle switching of a camera device mounted on the adapter by connecting it to different positions.

The first connection part 1 is equipped with a sliding slot 12 to which the second connection part 2 is slidably connected, providing further adjustment dimensions or positions for shooting distance and angle.

To prevent undesired sliding, a sliding locking piece 3 is provided on either the first connection part 1 or the second connection part 2 to limit the sliding between them.

The above description provides exemplary embodiments of the present disclosure, which should not be considered as limiting the scope of the disclosure. Any modifications, equivalent substitutions, or improvements made within the spirit and principles of the present disclosure should fall within the scope of the protection provided by the present disclosure.

The terminology used herein is for the purpose of describing particular examples only and is not intended to be limiting. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, processes, operations, elements, and/or components, but do not preclude the presence or addition of one or more other features, integers, processes, operations, elements, components, and/or groups thereof.

Any reference to an element herein using a designation e.g., "first," "second," and so forth does not generally limit the quantity or order of those elements. Rather, these designations are used herein as a convenient way of distinguishing between two or more elements or instances of an element. Thus, a reference to first and second elements does not mean that only two elements can be employed, or that the first element must precede the second element.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples described herein but is to be accorded the widest scope consistent with the principles and novel features disclosed herein.

What is claimed is:

1. An adapter for a photographic device, comprising:
   a fixed part, comprising a limiting portion movably connected to the fixed part; and
   a rotating part movably connected to the fixed part, wherein the rotating part comprises a plurality of second limiting grooves corresponding to the limiting portion on a side facing the fixed part, wherein the fixed part is equipped with a first locking member on a side facing away from the rotating part, the fixed part configured to lock the adapter in a mounting position, and wherein the rotating part is equipped with a second locking member configured to lock the photographic device with the adapter.

2. The adapter according to claim 1, further comprising:
a first locking limit part,
a sidewall of the rotating part is provided with a through-hole, into which the first locking limit part is inserted.

3. The adapter according to claim 2,
wherein the first locking limit part comprises:
a reset spring,
a button;
a first limiting bar, a first end of the first limiting bar being connected to the button, which protrudes from an outer side of the sidewall of the rotating part, and a second end of the first limiting bar including a limiting protrusion; and
a fixed block, the first limiting bar being movably connected to the fixed block, the reset spring being sleeved on the first limiting bar, with opposite ends of the reset spring respectively connected to the fixed block and the button,
the fixed part comprising multiple first limiting grooves that are inclined from the center of the fixed part towards the rotating part.

4. The adapter according to claim 1,
wherein the limiting portion comprises:
a toggle block;
a first limiting block; and
a first limiting spring, and
wherein the fixed part comprises:
a first mounting slot; and
a second mounting slot connected with the first mounting slot,
wherein the first limiting spring and the first limiting block are arranged in the first mounting slot, the first limiting spring is located between the first limiting block and a bottom of the first mounting slot, the first limiting block partially protrudes from the fixed part, and
wherein a first end of the toggle block is connected to the first limiting block, and a second end of the toggle block protrudes from the fixed part.

5. The adapter according to claim 1,
wherein the first locking member comprises:
a first locking latch;
a first locking part; and
a first locking pin,
a first end of the first locking pin is provided with a fluted disc, which engages with the first locking latch, a second end of the first locking pin is threadedly connected to the first locking part,
the fixed part further comprising a third mounting slot, and an end of the fixed part opposite to the third mounting slot being provided with a first clamping block, the first locking part being accommodated in the third mounting slot to form a first clamping space with the first clamping block.

6. The adapter according to claim 5, wherein the first locking part comprises a third limiting groove, and a bottom of the third mounting slot of the fixed part is provided with a first positioning pin, which is accommodated in the third limiting groove.

7. The adapter according to claim 1, wherein the second locking member comprises:
a second locking latch;
a second locking part; and
a second locking pin,
a first end of the second locking pin being provided with a fluted disc, which engages with the second locking latch, a second end of the second locking pin being threadedly connected to the second locking part,
the rotating part further comprising a fifth mounting slot, and one end of the rotating part opposite to the fifth mounting slot being provided with a second clamping block, the second locking part being accommodated in the fifth mounting slot to form a second clamping space with the second clamping block.

8. A connecting structure comprising:
a first connecting part;
a second connecting part connected to the first connecting part; and
the adapter according to claim 1,
both the first connecting part and the second connecting part comprise mounting positions, the adapter being detachably connected to one of the mounting positions.

9. The connecting structure according to claim 8, wherein a sliding locking piece is provided on either the first connecting part or the second connecting part to limit the sliding between the first connecting part and the second connecting part.

10. A photographic device characterized by adopting the connecting structure according to any one of claims 8-9, which includes the adapter.

* * * * *